Oct. 31, 1944.    R. E. SCHOCK    2,361,657
VARIABLE CONDENSER
Filed Nov. 15, 1940    2 Sheets-Sheet 1
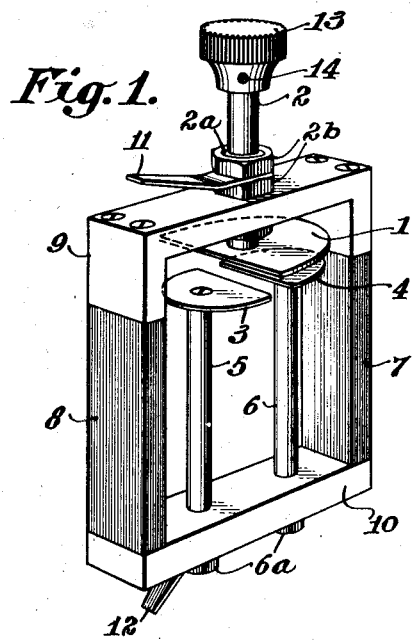
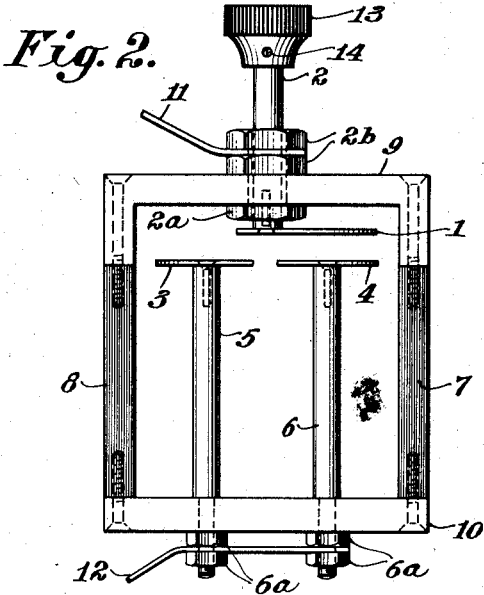
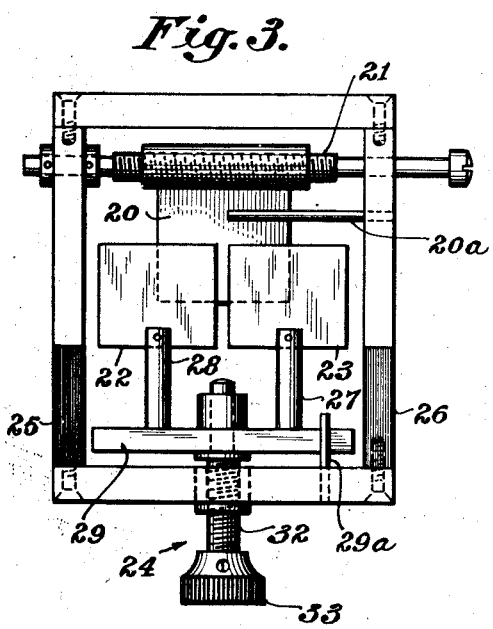
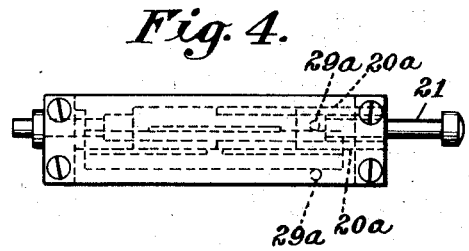
INVENTOR
Robert E. Schock
BY H. S. Surver
ATTORNEY Oct. 31, 1944.    R. E. SCHOCK    2,361,657
VARIABLE CONDENSER
Filed Nov. 15, 1940    2 Sheets-Sheet 2

INVENTOR
Robert E. Schock
BY
ATTORNEY

Patented Oct. 31, 1944

2,361,657

UNITED STATES PATENT OFFICE

2,361,657

VARIABLE CONDENSER

Robert E. Schock, Riverhead, N. Y., assignor to Radio Corporation of America, a corporation of Delaware Application November 15, 1940, Serial No. 365,748

13 Claims. (Cl. 175—41.5)

This invention relates to a new and useful temperature coefficient condenser.

An object of this invention is to provide a variable electrostatic condenser whose temperature coefficient of capacity may be varied between a negative value and a positive value.

Another object of this invention is to provide a variable condenser whose capacity may be varied in two temperature coefficient of capacity zones or a combination of both zones, one zone being of a positive temperature coefficient and the other zone being of a negative temperature coefficient.

A feature of this invention is the novel arrangement of three condenser plates or groups of plates so as to give a desired temperature coefficient. This is accomplished by having two stator plates placed alongside or being insulated from each other. The mounting of the stator plates is by means of employing two materials having a different temperature coefficient of expansion from each other. A rotor plate is mounted for rotation adjacent the two stator plates.

This invention will best be understood by referring to the accompanying drawings, in which:

Fig. 1 is a perspective view of one embodiment of this invention;

Fig. 2 is a side elevation of Fig. 1;

Fig. 3 is a side elevation of another embodiment of this invention;

Fig. 4 is a plan view of Fig. 3;

Figure 5:
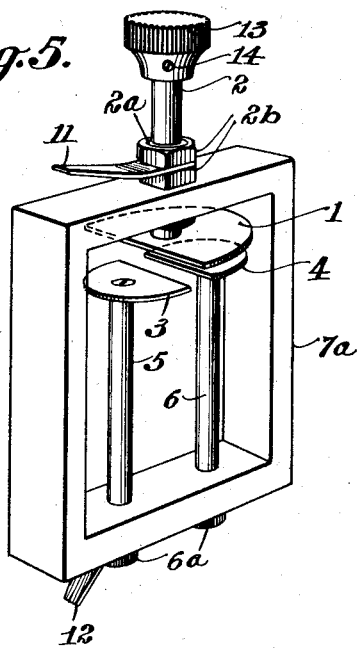
Fig. 5 is a perspective view similar to Fig. 1, except that the frame is constructed of a single member.

Referring now in detail to Figs. 1 and 2 of the drawings, the condenser rotor plate 1 is mounted upon a rotor shaft 2 and spaced as desired to give the proper capacity variation from the stator plates. The stator plate comprises two semicircular plates 3 and 4. The mounting of stator plate 3 includes a rod-like electrical conductor 5 having a very low temperature coefficient of expansion, such as for example, Invar. The stator plate 4 is mounted upon a similar rod 6 and is in the form of an electrical conductor having a relatively high temperature coefficient of linear expansion, such as for example, brass. The side walls 7 and 8 which space the upper and lower parts 9 and 10 of the condenser structure are preferably made non-conductors of electricity with a temperature coefficient of linear expansion lying between the average coefficients of the two stator plate mounting members 5 and 6. An example of such a material is that of Isolantite. Members 9 and 10 should preferably have a low temperature coefficient of linear expansion and for the purpose of the proper operation of this condenser may be either conducting or non-conducting material, with proper means to provide insulation of the rotor plates from stator plates 3 and 4, if the mounting frame is made of conducting material. The length of members 7 and 8 is shown substantially equal to members 5 and 6. However, the real prerequisite to correct operation is that the total linear expansion or contraction of the side walls with temperature changes must be less than the expansion or contraction of stator support 6, and greater than the expansion or constraction of stator support 5, with the same temperature changes. The rotor plate 1 is provided with a bushing 2a having lock nuts 2b between which is clamped a connecting terminal strip 11. The lower ends of the stator mounting rods 5 and 6 are shouldered and threaded to receive nuts 6a. Between the nuts there is clamped a connecting terminal member 12 and although the figure shows member 12 connecting between both threaded portions of rods 5 and 6, it is to be understood that if member 10 is to be of conducting material, it will not be necessary to connect both rods electrically together. An insulating knob 13 is secured to shaft 2 by means of a set screw 14 and serves the purpose of varying the condenser capacity between the electrodes by rotating plate 1.

In the operation of the condenser of this invention, if one is to first consider the temperature coefficient of the capacity of the condenser which exists when the rotor plate 1 is placed in a maximum capacity position adjacent to stator plate 3, the mounting post 5 of this stator plate, as mentioned above, has a low temperature coefficient of linear expansion as compared with the coefficient of linear expansion of parts 7 and 8 of the condenser mounting. If the temperature rises, the expansion of parts 7 and 8 tends to increase the distance between stator plate 3 and rotor plate 1, and the expansion of part 5 tends to decrease this distance. However, since parts 7 and 8 expand much more than part 5 for the same temperature rise, the net result is an increase of the distance between stator plate 3 and rotor plate 1, thus causing the capacity to decrease. Therefore, the condenser with the rotor in this position or zone has a negative temperature coefficient of capacity.

Now, if the rotor in its maximum capacity position is turned so that rotor plate 1 is adjacent to stator plate 4, the condition above is reversed since part 6 expands more than parts 7 and 8 with an increase in temperature, and decreases the distance of stator plate 4 to rotor plate 1. Thus, the capacity increases with a rise in temperature when the rotor is in this position and therefore the condenser has a positive temperature coefficient of capacity when the rotor is in this position.

It will be seen that the operation will be the same if the frame or mounting parts 9 and 10, Fig. 1, are made of insulating material with a low coefficient of linear expansion and parts 7 and 8 are made of any material either electrically conducting or non-conducting so long as its coefficient of linear expansion lies approximately midway between that of parts 5 and 6. The temperature coefficient of capacity setting used will be determined by whether the correct operation of the circuit in which it is used calls for an increase in capacity with an increase in temperature or for a decrease in capacity with an increase in temperature. For example, the arrangement of Fig. 1 might find use as the capacity element in the tuned circuit of a self-controlled oscillator whose frequency of oscillation we do not want ambient temperature changes to influence. After the oscillator circuit is assembled and in operation, the temperature coefficient of capacity of this capacity element may be varied experimentally until the setting is found whereby changes in the ambient temperature do not shift the oscillator frequency. If the temperature coefficients of the other elements of the oscillatory circuit are such that they function to decrease the frequency when the temperature increases, then this condenser setting will have to be some degree of negative coefficient of capacity so that an increase in temperature will cause its capacity to decrease enough to result in zero frequency change.

In the condenser of Figs. 1 and 2, it is assumed that the position and shape of the stator and rotor plates is such that the temperature remaining constant, no capacity change takes place with rotation of the rotor plate. It might therefore be termed a condenser with fixed capacity and variable temperature coefficient of capacity at a predetermined capacity setting.

In the embodiment as shown by the condenser of Figs. 3 and 4, provision is made for varying either or both the capacity, and the temperature coefficient of capacity. As shown by the drawings, the movement of the condenser plate 20 is made by turning screw thread 21 and provides a means of changing the temperature coefficient of capacity. The movement of condenser plates 22 and 23 is accomplished by turning screw 24 and provides a means of changing the condenser capacity. The means of getting the positive and negative temperature coefficients of capacity in this condenser is of the same general principle as is shown in Figs. 1 and 2, that is, in Figs. 3 and 4, condenser frame parts 25 and 26 have a temperature coefficient of linear expansion which is less than the coefficient of support 27 of condenser plate 23 and greater than the coefficient of support 28 of condenser plate 22. All the rest of the condenser frame assembly is preferably made of material with a very low linear expansion of coefficient. To prevent radial movement of plate 20, a plurality of pins 20a are provided. Support member 29 is likewise retained in proper alignment by means of a plurality of pins 29a. The plates 22 and 23 are moved with respect to plate 20 by means of a threaded stud 32 which terminates in an insulating knob 33. The operation of this embodiment is as follows: When plate 20 is shifted to a position adjacent to plate 22, the condenser has a negative temperature coefficient of capacity. When shifted to a position adjacent to plate 23, the condenser has a positive temperature coefficient of capacity. Shifting condenser plate 20 does not change the capacity of the condenser but only its temperature coefficient. The capacity variation of the condenser is made by screw 24 which shifts plates 22 and 23 with respect to plate 20 in such a manner as to change the condenser capacity.

Figure 6:
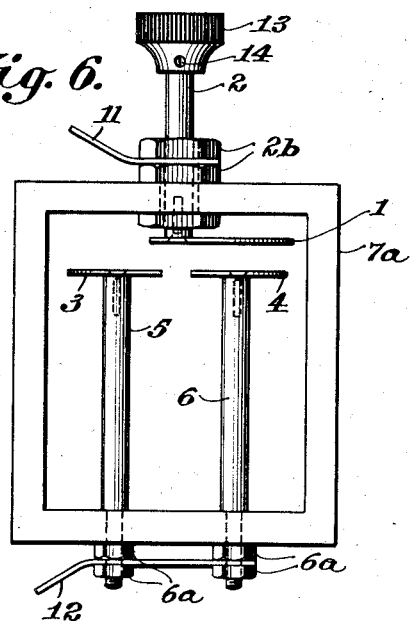
Fig. 6 is a side view of Fig. 5.

Figs. 5 and 6 show the modifications of Figs. 1 to 4, inclusive, constructed of a single frame element, instead of a composite frame structure. It will be noted in Figs. 5 and 6 that the condenser construction is identical with the showing of the condenser in Figs. 1 and 2, except that the composite members 7 to 10, inclusive, are substituted by a single insulating member 7a, the material of which preferably has a temperature coefficient of expansion equal to an average temperature of electrode mounting members 5 and 6 so that the coefficient linear expansion or contraction of elements 7a between points A and B shown in Fig. 6 is greater than the element 5 and less than that of element 6 and preferably mid-way between to provide the proper operation of the device of this invention.

Figure 7:
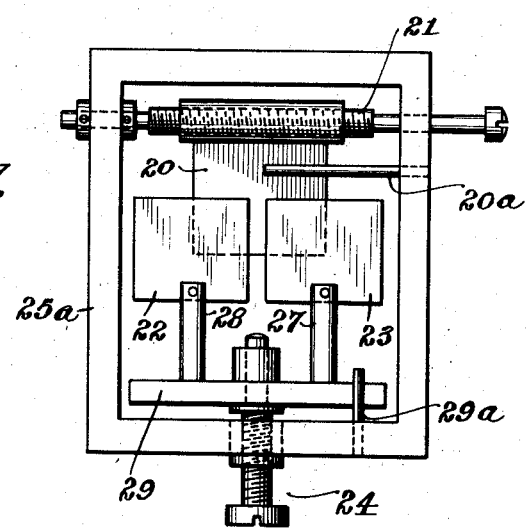
Fig. 7 is a side elevation similar to Fig. 3, except that the frame is constructed of a single member.

The modification shown in Fig. 7 is substantially similar to that of Fig. 3, except that the element 25a replaces the composite structure comprising elements 25, 26, 30 and 31. In this construction, the coefficient of linear expansion of element 25a must be such that the linear expansion and contraction of the insulating material comprising element 25 between points A and B is less than that of mounting element 27 and greater than that of mounting element 28 and preferably mid-way therebetween.

While only a few embodiments of this invention are disclosed, the invention should not be limited precisely thereto.

What is claimed is:

1. An electrical condenser comprising a plurality of electrodes, separate mounting means for each one of said electrodes, one of said electrodes being mounted upon an Invar support member, the other electrode being mounted upon a brass support member, and a third electrode being disposed in capacitive relation with the other two electrodes and mounted upon a support member having its material and the direction of expansion an average temperature coefficient of linear expansion between said Invar and brass support members.

2. An electric condenser comprising a pair of fixed electrodes and a variable electrode, fixed electrode mounting means, the temperature coefficient of expansion of one fixed electrode mounting means being different from that of the other fixed electrode mounting means, and threaded means for said fixed electrodes whereby the fixed electrodes are moved with respect to said variable electrode to vary the capacity of the condenser.

3. An electric condenser comprising a pair of fixed electrodes, a variable electrode, fixed electrode mounting means, the temperature coefficient of expansion of one fixed electrode mounting means being different from that of the other fixed electrode mounting means, threaded means for said variable electrode whereby the variable electrode is moved with respect to said fixed electrodes to vary the temperature coefficient of capacity setting of the condenser, a second threaded means, and a movable platform secured to said second threaded means and arranged to support said fixed electrode mounting means to vary the condenser capacity.

4. An electrical condenser comprising a pair of fixed electrodes, a variable electrode, a fixed electrode mounting means, the temperature coefficient of expansion of one fixed electrode mounting means being different from that of the other fixed electrode mounting means, separate threaded means for both the fixed and variable electrodes whereby the variable and both of the fixed electrodes are varied independently and with respect to each other to vary the capacity of the condenser.

5. An electrical condenser comprising a movable electrode and a plurality of fixed electrodes, means to move the position of said fixed electrodes relative to said movable electrode, separate mounting means for each one of said fixed and movable electrodes, said fixed electrode mounting means being supported by the means for moving the position of said fixed electrodes, the temperature coefficient of linear expansion of each separate electrode mounting means being different from each one of the other electrode mounting means.

6. An electric condenser comprising three variable electrodes including a movable electrode and two fixed electrodes, separate mounting means for each electrode, means for varying the condenser capacity setting, means for varying the temperature coefficient of capacity of said condenser by having all three electrodes cooperate capacitively with each other, each one of said electrode mounting means having a temperature coefficient of expansion different from that of the other two electrode mounting means.

7. An electric condenser comprising three rectilinear electrodes including a movable electrode and two fixed electrodes, separate mounting means for each electrode, means for varying the condenser capacity setting, means for varying the temperature coefficient of capacity of said condenser by having all three electrodes cooperate capacitively with each other, each one of said electrode mounting means having a temperature coefficient of expansion different from that of the other two electrode mounting means.

8. An electrical condenser comprising an insulating frame, a plurality of electrodes including a movable electrode and at least two fixed electrodes, separate mounting means for each one of said electrodes, each one of said electrode mountting means having a different temperature cofficent of linear expansion, the temperature coefficient of linear expansion of the movable electrode mounting means being an average of that of the fixed electrode mounting means.

9. An electrical condenser comprising a metallic frame sub-divided by insulating means, a plurality of electrodes including a movable electrode and two fixed electrodes, separate mounting means for each one of said fixed electrodes, said movable electrode being supported by said insulating means, the temperature coefficient of expansion of one fixed electrode mounting means being different from that of the other fixed electrode mounting means and from that of said insulating means.

10. An electrical condenser comprising a plurality of electrodes including a movable electrode and at least two fixed electrodes located adjacent one another, separate mounting means for each one of said electrodes, means for rotating said movable electrode, a mounting frame for all of said electrodes, said movable electrode disposed in capacitive relation with said fixed electrodes, each separate mounting means for the two fixed electrodes having a temperature coefficient of linear expansion different from that of the other fixed electrode mounting means and that of the adjacent movable electrode mounting means, both of said fixed electrode mounting means and the movable electrode mounting means being positioned in the same plane and secured to the inside surface of said mounting frame.

11. An electric condenser comprising a plurality of electrodes including a movable electrode and two fixed electrodes, separate mounting means for each one of said fixed electrodes, each separate mounting means having a temperature coefficient of linear expansion different from that of the other fixed electrode mounting means, means for rotating at least one of said electrodes, a hollow rectilinear frame for mounting said movable electrode, the material and length of the side walls being such as to have a coefficient of linear expansion greater than the mounting means of one fixed electrode and less than the mounting means of the other fixed electrode.

12. An electric condenser comprising a plurality of electrodes including a movable electrode and two fixed electrodes, separate mounting means for each one of said fixed electrodes, each separate mounting means having a temperature coefficient of linear expansion different from that of the other fixed electrode mounting means, means for rotating at least one of said fixed electrodes, a hollow rectilinear frame for mounting said movable electrode, the material and length of the side walls being such as to have a coefficient of linear expansion which is an average between the amount of linear expansion of both of said fixed electrode mounting means.

13. An electrical condenser comprising two semi-circular fixed electrodes, a semi-circular variable electrode, mounting means for said semi-circular variable electrode, separate mounting means for each one of sair fixed electrodes, the temperature coefficient of expansion of one fixed electrode means being different from that of the other fixed electrode mounting means and said semi-circular variable electrode mounting means, and a shaft located in a center plane between said fixed electrode mounting means for rotating said semi-circular variable electrode to change the temperature coefficient of capacity setting of said condenser.

ROBERT E. SCHOCK.